(12) United States Patent
Kari

(10) Patent No.: US 9,252,627 B2
(45) Date of Patent: Feb. 2, 2016

(54) WIRELESS ENERGY TRANSFER

(71) Applicant: Nokia Technologies Oy, Espoo (FI)

(72) Inventor: Juhani Valdemar Kari, Lieto (FI)

(73) Assignee: Nokia Technologies Oy, Espoo (FI)

( * ) Notice: Subject to any disclaimer, the term of this patent is extended or adjusted under 35 U.S.C. 154(b) by 323 days.

(21) Appl. No.: 13/725,351

(22) Filed: Dec. 21, 2012

(65) Prior Publication Data

US 2014/0177139 A1 Jun. 26, 2014

(51) Int. Cl.
*G06F 1/16* (2006.01)
*H02J 7/02* (2006.01)

(52) U.S. Cl.
CPC ............ *H02J 7/025* (2013.01); *Y10T 29/49117* (2015.01)

(58) Field of Classification Search
CPC ... G06F 1/1626; G06F 1/1628; G06F 1/1632; G06F 1/1633; G06F 1/1635; G06F 1/189; H01F 5/00
USPC ........................................................ 320/114
See application file for complete search history.

(56) References Cited

U.S. PATENT DOCUMENTS

| | | | | |
|---|---|---|---|---|
| 7,782,610 | B2 * | 8/2010 | Diebel et al. ............. | 361/679.56 |
| 7,855,529 | B2 * | 12/2010 | Liu ................ | 320/108 |
| 8,483,758 | B2 * | 7/2013 | Huang .......................... | 455/557 |
| 8,552,683 | B2 * | 10/2013 | Sohn ............... | 320/107 |
| 8,610,398 | B2 * | 12/2013 | Lee et al. ...................... | 320/108 |
| 8,729,854 | B2 * | 5/2014 | Tsai et al. ...................... | 320/108 |
| 2002/0135974 | A1 * | 9/2002 | Bell et al. ...................... | 361/681 |
| 2006/0226805 | A1 * | 10/2006 | Yu ................................. | 320/107 |
| 2008/0116847 | A1 | 5/2008 | Loke et al. | |
| 2008/0123285 | A1 * | 5/2008 | Fadell et al. ................... | 361/686 |
| 2008/0278899 | A1 * | 11/2008 | Hotelling et al. ............. | 361/683 |
| 2010/0078343 | A1 * | 4/2010 | Hoellwarth et al. .......... | 206/320 |
| 2010/0081505 | A1 * | 4/2010 | Alten et al. ...................... | 463/36 |
| 2010/0312938 | A1 * | 12/2010 | Stampfli ....................... | 710/304 |
| 2012/0001590 | A1 | 1/2012 | Yeh | |
| 2012/0088555 | A1 | 4/2012 | Hu | |
| 2013/0058023 | A1 * | 3/2013 | Supran et al. ............ | 361/679.01 |
| 2014/0065948 | A1 * | 3/2014 | Huang .............................. | 455/7 |
| 2014/0146455 | A1 * | 5/2014 | Abdelsamie et al. .... | 361/679.02 |
| 2014/0146464 | A1 * | 5/2014 | Abdelsamie et al. .... | 361/679.41 |

FOREIGN PATENT DOCUMENTS

CN 201733142 U 2/2011

OTHER PUBLICATIONS

Buy Wireless charger for mobile phones For 1 cheap price from Shenzhen Heyuan Techn . . . [online] [retrieved Feb. 22, 2013]. Retrieved from the Internet: <URL: http://www.taiboto.com/selling-leads/31251/Wireless-charger-for-mobile-phones.html>. (dated 2011) 1 page.

(Continued)

*Primary Examiner* — Anthony Q Edwards
(74) *Attorney, Agent, or Firm* — Alston & Bird LLP

(57) ABSTRACT

Apparatus and a method are provided. One example of the apparatus comprises: a housing, defining a through-hole, configured to retain an electronic device in the through-hole; at least one coil configured to receive energy wirelessly; and an electrical connector configured to provide energy received by the at least one coil to an electronic device retained in the through-hole.

16 Claims, 11 Drawing Sheets

(56) References Cited

OTHER PUBLICATIONS

Nokia is Working on NFC and Wireless Charging for the Lumia Lineup [online] [retrieved Feb. 22, 2013]. Retrieved from the Internet: <URL: http://www.gottabeamobile.com/2012/01/31/nokia-is-working-on-nfc-for-the-nokia-lumia-series/>. (publication date Jan. 31, 2012) 5 pages.

* cited by examiner

WIRELESS ENERGY TRANSFER

TECHNOLOGICAL FIELD

Embodiments of the present invention relate to wireless energy transfer. In particular, they relate to an apparatus that receives energy wirelessly and provides it to an electronic device.

BACKGROUND

Energy may be transferred to an electronic device, such as a mobile telephone, using inductance. For example, a charging base station may use a first induction coil to create an alternating electromagnetic field. The alternating electromagnetic field induces a current in a second induction coil positioned in the electronic device, thus transferring energy from the charging base station to the electronic device.

BRIEF SUMMARY

According to various, but not necessarily all, embodiments of the invention there is provided an apparatus, comprising: a housing, defining a through-hole, configured to retain an electronic device in the through-hole; at least one coil configured to receive energy wirelessly; and an electrical connector configured to provide energy received by the at least one coil to an electronic device retained in the through-hole.

According to various, but not necessarily all, embodiments of the invention there is provided a method, comprising: providing a housing, defining a through-hole, configured to retain an electronic device in the through-hole; providing at least one coil configured to receive energy wirelessly; and providing an electrical connector configured to provide energy received by the at least one coil to an electronic device retained in the through-hole.

According to various, but not necessarily all, embodiments of the invention there is provided an apparatus, comprising: a housing for housing an electronic device; at least one coil, for receiving energy wirelessly, coiled around an electronic device housed by the housing; and an electrical connector configured to provide energy received by the at least one coil to the electronic device.

BRIEF DESCRIPTION

For a better understanding of various examples that are useful for understanding the brief description, reference will now be made by way of example only to the accompanying drawings in which.

DETAILED DESCRIPTION

Embodiments of the invention relate to an apparatus 10/11/12 that receives power wirelessly and conveys it to an electronic device 100/101/102. In this regard, the appended figures illustrate an apparatus 10/11, comprising: a housing 20, defining a through-hole 30, configured to retain an electronic device 100/101 in the through-hole 30; at least one coil 40 configured to receive energy wirelessly; and an electrical connector 50 configured to provide energy received by the at least one coil 40 to an electronic device 100/101 retained in the through-hole 30.

The appended figures further illustrate an apparatus 10/11/12, comprising: a housing 20 for housing an electronic device 100/101/102; at least one coil 40, for receiving energy wirelessly, coiled around an electronic device 100/101/102 housed by the housing 20; and an electrical connector 50 configured to provide energy received by the at least one coil 40 to the electronic device 100/101/102.

Figure 1:
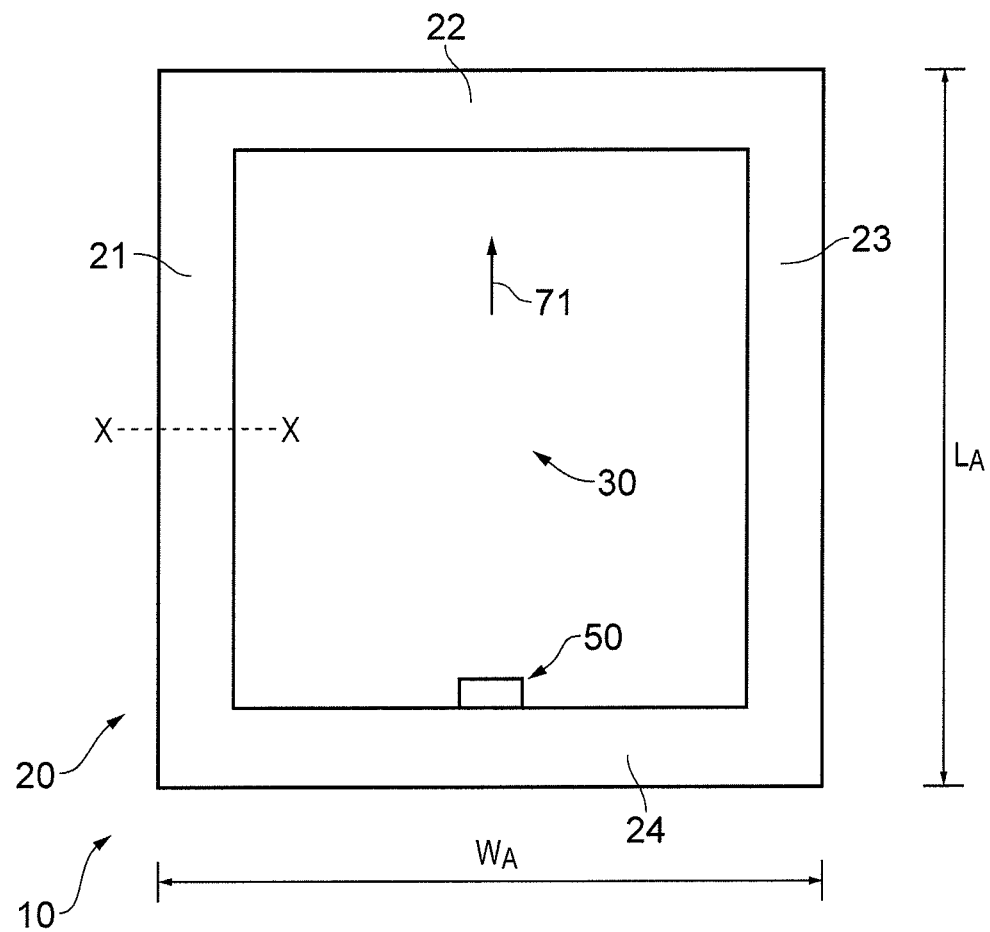
FIG. 1 illustrates a front elevation of a first apparatus.
Figure 2:
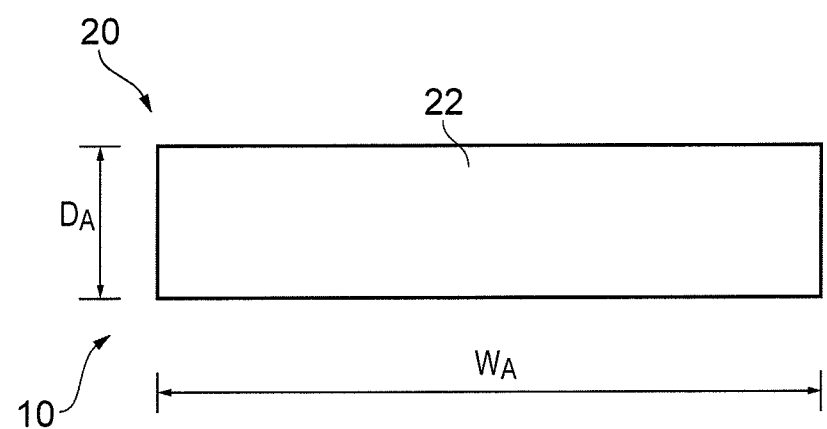
FIG. 2 illustrates a plan view of the first apparatus.

FIG. 1 illustrates a front elevation of an apparatus 10. FIG. 2 illustrates a plan view of the apparatus 10. The apparatus 10 comprises a housing 20, at least one coil 40 and an electrical connector 50. The apparatus 10 (and in this instance, also the housing 20) has a length $L_A$, a width $W_A$ and a depth $D_A$. In the illustrated example, the length $L_A$ is greater than the width $W_A$ and the width $W_A$ is greater than the depth $D_A$. In other examples, the length $L_A$ and the width $W_A$ might be the same or similar.

The housing 20 may, for example, be made from a plastic material. The housing 20 defines an aperture 30 and is configured to house an electronic device by retaining it in the aperture 30. In the illustrated example, the aperture 30 is a through-hole in the housing 20.

The housing 20 may comprise one or more walls 21-24 that define the through-hole 30 and retain the electronic device. In the example illustrated in FIG. 1, the housing 20 comprises first, second, third and fourth walls 21, 22, 23 and 24. The walls 21-24 of the housing 20 may be integrally formed.

The first wall 21 is connected with the second wall 22 and the fourth wall 24. In this example, the second wall 22 and the fourth wall 24 are substantially perpendicular to the first wall 21 and substantially parallel with each other.

The second wall 22 is connected with the third wall 23 and is substantially perpendicular to it. The third wall 23 is connected with the fourth wall 24 and is substantially perpendicular to it.

Figure 5:
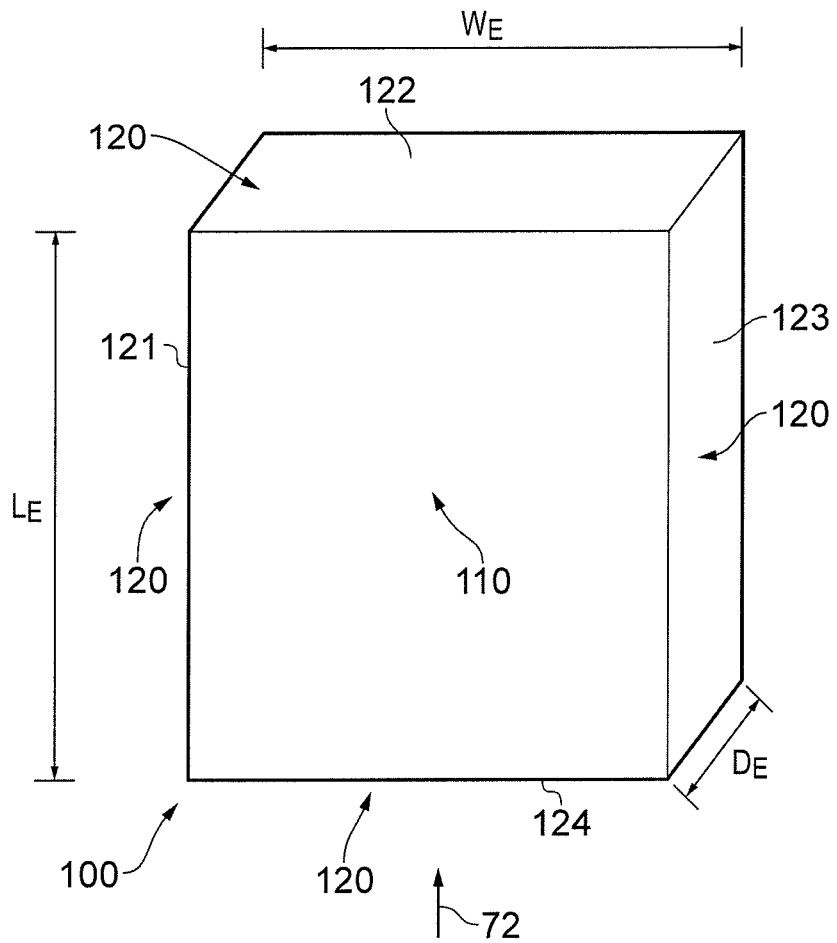
FIG. 5 illustrates a perspective view of a first electronic device.

In the example illustrated in FIG. 5 the electrical connector 50 is a male connector that extends away from the fourth wall 24 and towards the second wall 22. The electrical connector 50 is configured to provide energy received by the at least one coil 40 of the apparatus 10 to an electronic device retained within the through-hole 30.

The walls 21-24 are configured to retain an electronic device in the through-hole 30. They may use any suitable technique including, for instance, ribs, clips, springs, friction or adhesion.

Figure 3:
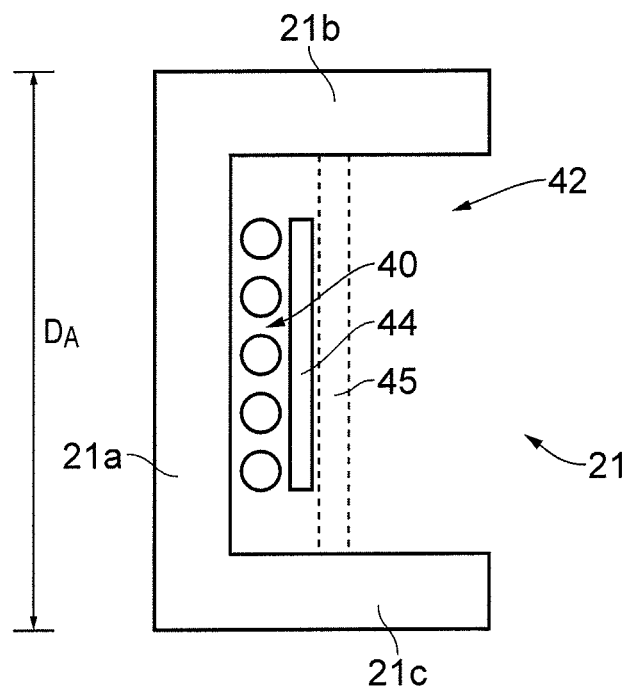
FIG. 3 illustrates a cross section of a wall of the first apparatus.

In this example, each wall 21-24 has a substantially c-shaped cross section. FIG. 3 illustrates a cross-section of the first wall 21. The first wall 21, like the second, third and fourth walls 22-24, comprises an outer portion 21a, a first flange 21b and a second flange 21c. The outer portion, the first flange and the second flange in each wall 21-24 define a recess/channel 42 that extends across the each of the walls 21-24.

In use, when the apparatus 10 is fitted onto an electronic device and retained in the through-hole 30, a portion of the electronic device extends into the recess/channel 42. The walls 21-24 may surround and grip a periphery of the electronic device, holding it in the through-hole 30. In some implementations, the walls 21-24 of the housing 20 may be resiliently biased to grip the electronic device and hold it in the through-hole 30.

The male electrical connector 50 of the apparatus 10 is positioned to connect with a female electrical connector of an electronic device retained in the through-hole 30.

In this example, the apparatus 10 includes a single coil 40, but in other implementations multiple coils might be provided. The coil 40 extends along the walls 21-24 of the apparatus 10 and is configured to receive energy wirelessly. When an electronic device is retained in the through-hole 30, the coil 40 is coiled around the periphery of the electronic device. In this example, the coil 40 is wound around a (ferrite) shield 44 within the recess/channel 42, such that it extends multiple times along each of the walls 21-24 and around a retained electronic device.

The shield 44 extends around the walls 21-24 of the apparatus 10 within the recess/channel 42, such that it is positioned around the periphery of an electronic device retained in the through-hole 30. The shield 44 is configured to prevent/mitigate interference being caused in electronics in a retained electronic device by an electromagnetic field generated by current in the coil 40. The shield 44 may also be configured to increase inductance in the coil 40 and prevent/mitigate heating in a retained electronic device.

FIG. 3 illustrates the coil 40 extending multiple times along the first wall 21. In some examples, a cover 45 may be provided to separate the coil 40 and the shield 44 from an electronic device being retained in the through-hole 30.

Figure 4:
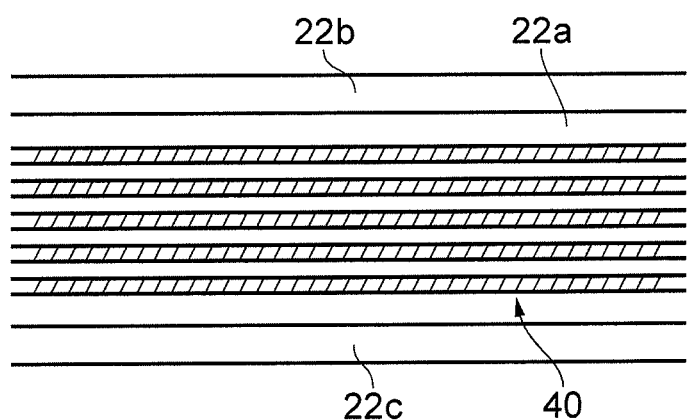
FIG. 4 illustrates an interior view of the first apparatus.

FIG. 4 illustrates the coil 40 extending multiple times across the second wall 22. The first FIG. 4 illustrates the interior of the second wall 22 as viewed in the direction of the arrow labeled with the reference numeral 71 in FIG. 1. For ease of explanation, no cover 45 or shield 44 is shown in FIG. 4. The outer portion 22a, the first flange 22b and the second flange 22c of the second wall 22 can be seen in FIG. 4.

In some implementations, the apparatus 10 may include electronics such as an alternating current (AC) to direct current (DC) converter and a processor such as a digital controller. The processor may be configured to control energy flow (for example, for charging) in accordance with a particular standard or standards (such as the Qi interface standard). Alternatively, the electronics (such as the AC to DC converter and the processor) may be included in an electronic device 100 to be retained by the apparatus 10, rather than the apparatus 10 itself.

FIG. 5 illustrates an electronic device 100 that may be retained by the housing 20. The electronic device 100 could, for example, be an accessory device or a mobile computing device. The accessory device may, for instance, have the shape of a tile. The accessory device could be any type of accessory device. Examples of an accessory device include a remote for headphones, a remote camera, and a battery.

Examples of a mobile computing device include a mobile telephone, a tablet computer, a dedicated games console and a portable music player.

The electronic device 100 has a length $L_E$, a width $W_E$ and a depth $D_E$. In the illustrated example, the length $L_E$ is greater than the width $W_E$ and the width $W_E$ is greater than the depth $D_E$. In other examples, the length $L_E$ and the width $W_E$ might be the same or similar.

The electronic device 100 has a front face 110 and a rear face 112 (not shown in FIG. 5). The front face 110 and the rear face 112 are separated by the depth $D_E$ of the electronic device 100. The electronic device 100 may comprise an electronic display on its front face 110 and/or rear face 112 (not shown in FIG. 5). The electronic display could, for example, be a liquid crystal display (LCD), an organic light emitting diode (OLED) display, an electrophoretic ink display or a quantum dot display.

The electronic device 100 comprises two peripheral surfaces 121, 123 defined by the length $L_E$ and the depth $D_E$ of the electronic device 100, and two peripheral surfaces 122, 124 defined by the width $W_E$ and the depth $D_E$ of the electronic device 100. The periphery of the electronic device 100 is generally indicated in FIG. 5 by the reference numeral 120.

Figure 6:
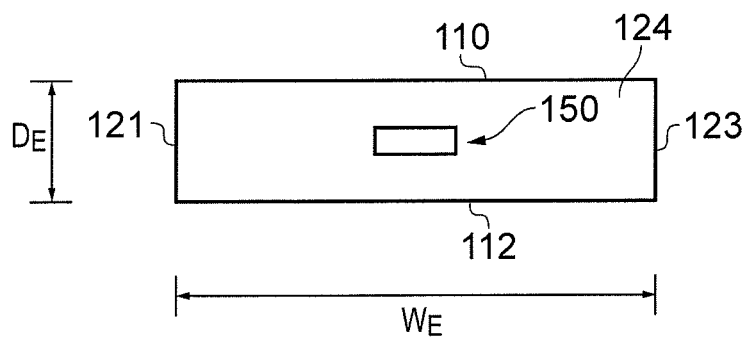
FIG. 6 illustrates the underside of the first electronic device.

FIG. 6 illustrates the underside 124 of the electronic device 100, as viewed in the direction of the arrow labeled with the reference numeral 72 in FIG. 5. The underside of the electronic device 100 comprises an electrical connector 150. In this example, the electrical connector 150 is a female connector.

Figure 7A:
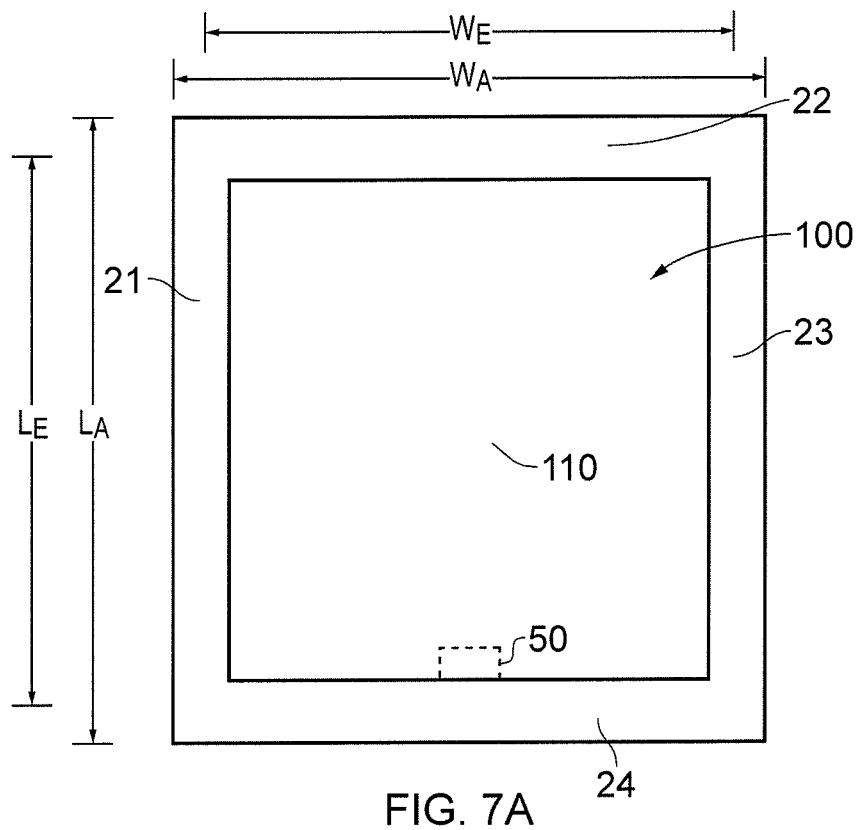
FIG. 7A illustrates a front elevation showing the first electronic device being retained by the first apparatus.
Figure 7B:
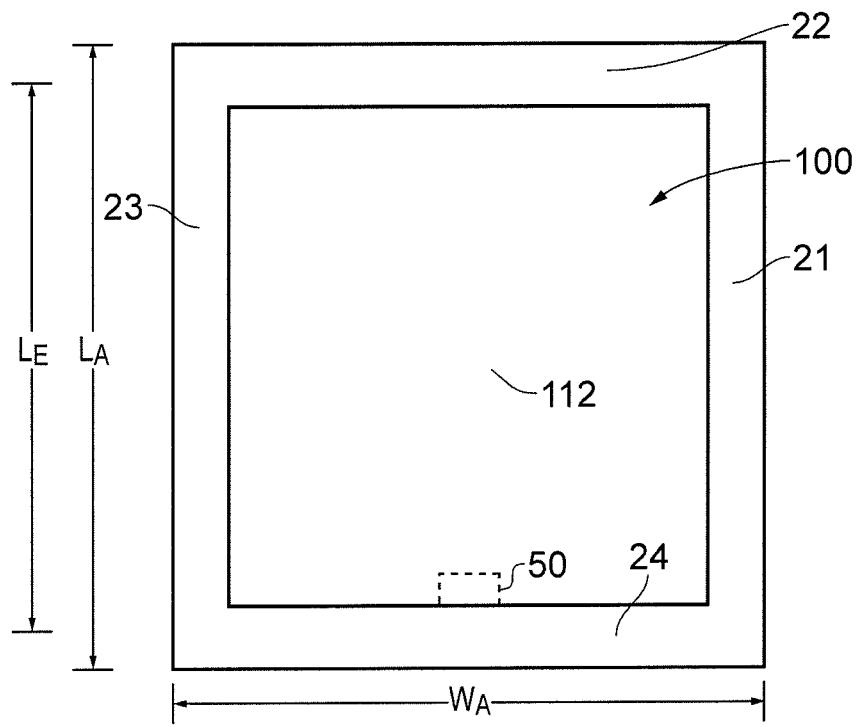
FIG. 7B illustrates a rear elevation showing the first electronic device being retained by the first apparatus.

FIG. 7A illustrates a front elevation showing the electronic device 100 being retained by the housing 20. FIG. 7B illustrates a rear elevation showing the electronic device 100 being retained by the housing 20. It can be seen in FIGS. 7A and 7B that the walls 21-24 of the housing 20 extend around the periphery 120 of the electronic device 100 and leave the first face 110 and the second face 112 substantially or fully exposed.

The electrical connector 50 of the apparatus 10 is electrically connected (and in this example positioned within) the electrical connector 150 of the electronic device 100. The electrical connectors 50, 150 may each be a form of Universal Serial Bus (USB) connector, such as Micro-USB connectors. In other examples, one of the electrical connectors 50, 150 (such as the electrical connector of the apparatus 10) could be a spring connector and the other electrical connector might be an electrical contact pad. An electrical contact pad could, for instance, have the shape of a logo/brand name.

The apparatus 10 advantageously enables energy from a further apparatus, such as a wireless charging station, to be conveyed to the electronic device 100. This may be via inductive coupling or magnetic resonance. For example, when the apparatus 10 is placed on or near a wireless charging station that emits electromagnetic waves comprising electromagnetic energy, the electromagnetic waves induce a current in the coil 40 which is provided to the electronic device 100 via the electrical connector 50. The induced current may be used to charge a battery or a capacitor of the electronic device 100, and/or it may be used to supply power to the electronic device 100 directly.

Advantageously, an electronic device 100 retained by the apparatus 10 can be charged when the electronic device 100 is in multiple different orientations, due to the positioning of the coil 40 around the electronic device 100. For example, if a wireless charging pad were used, the electronic device 100 could be placed in almost any orientation (such as on its front face 110 or its rear face 112) for charging to occur.

The housing 20 of the apparatus 10 may also advantageously provide a protective bumper for the electronic device 100, without increasing the thickness of the electronic device 100 across the device's whole width and the device's whole length. In some examples, the walls 21-24 may be shaped such that the thickness of the device is not increased at all.

Figure 8:
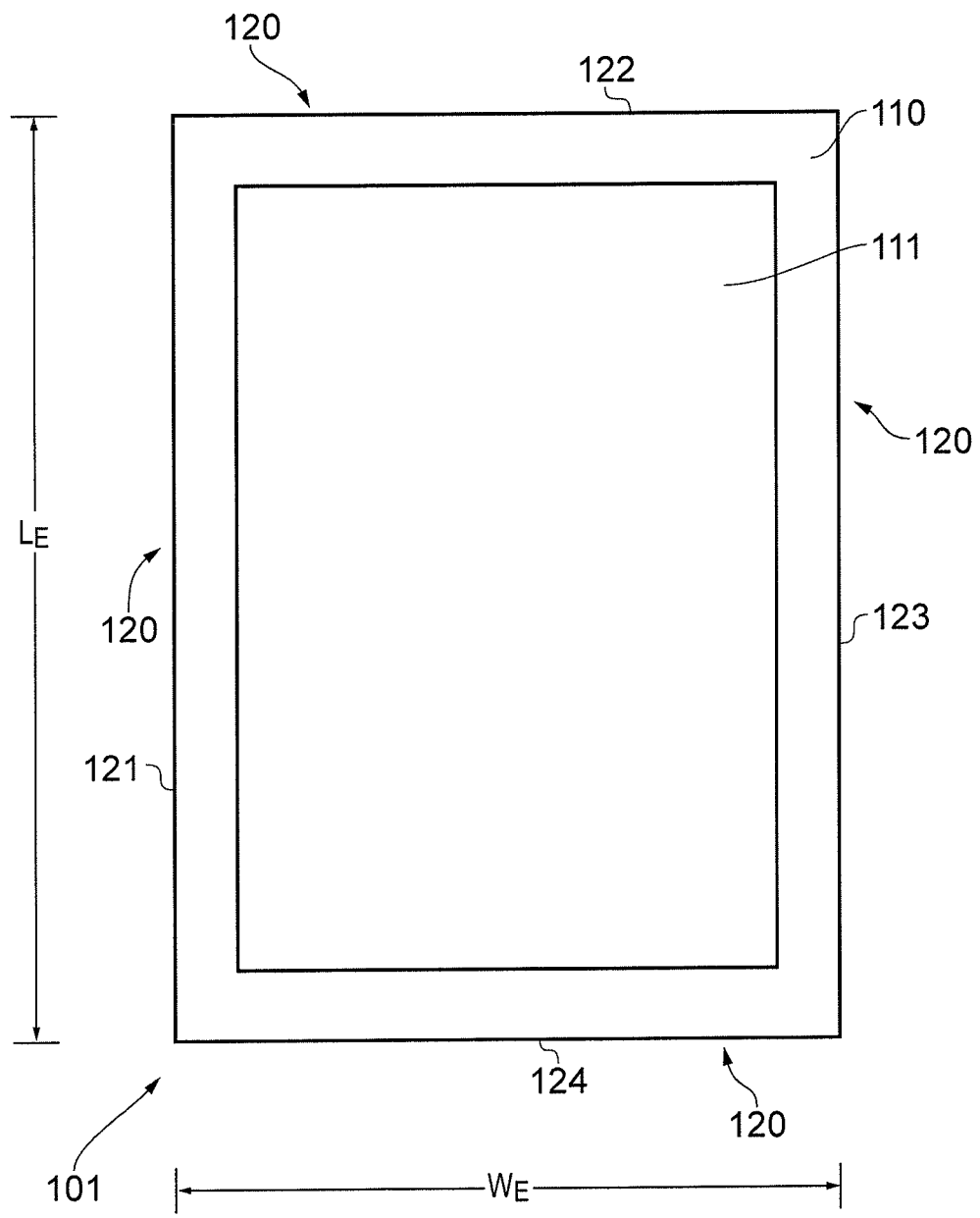
FIG. 8 illustrates a second electronic device.
Figure 9A:
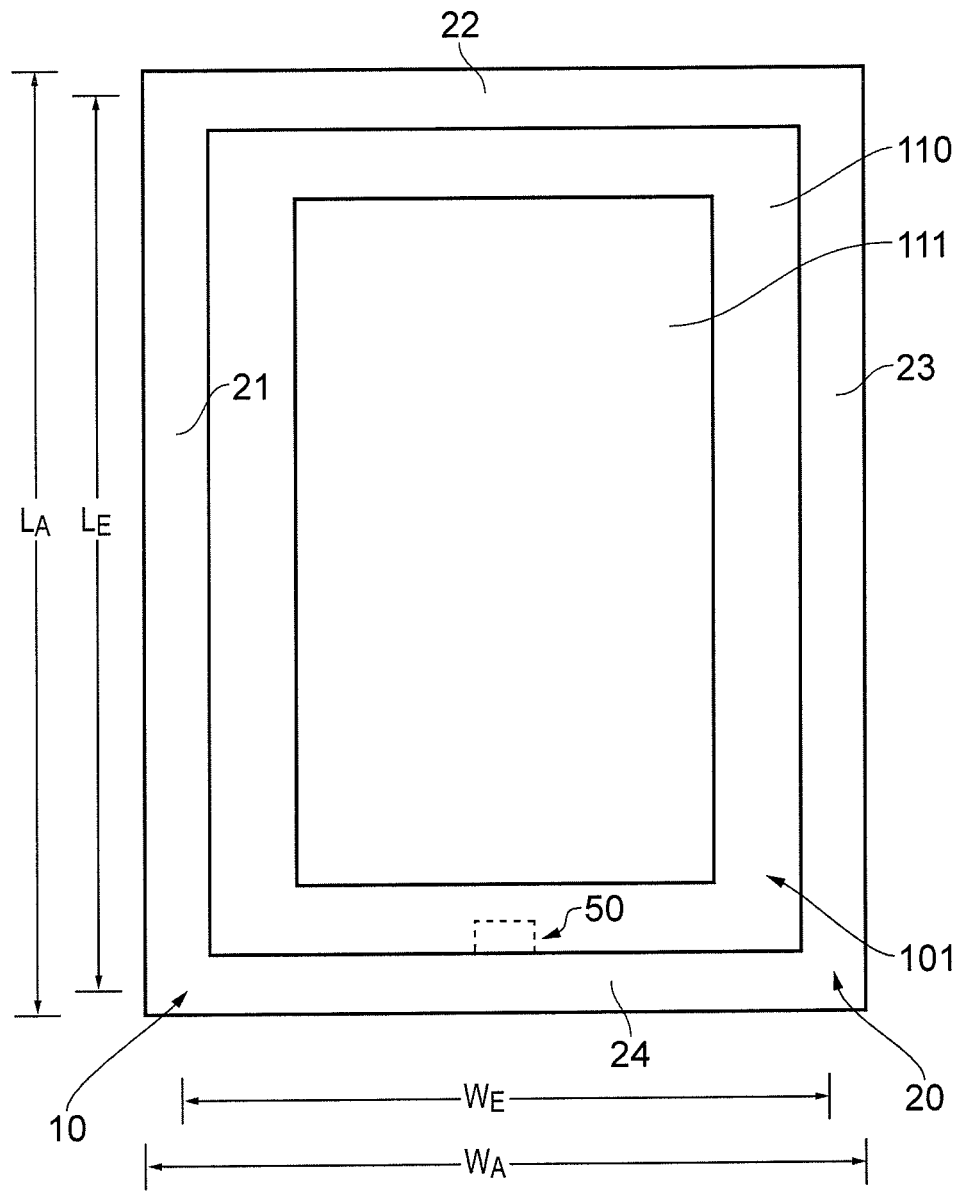
FIG. 9A illustrates a front elevation showing the second electronic device being retained by the first apparatus.
Figure 9B:
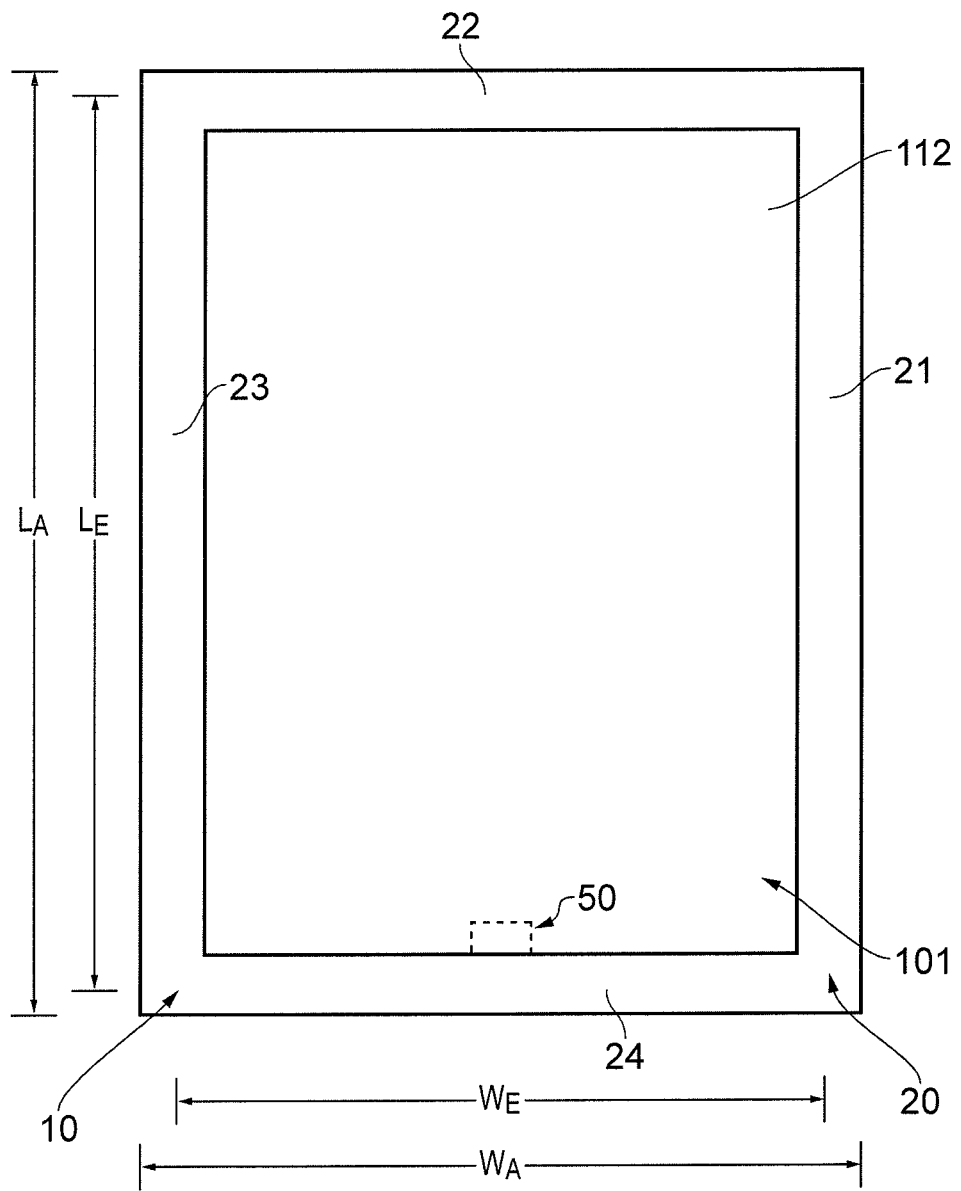
FIG. 9B illustrates a rear elevation showing the second electronic device being retained by the first apparatus.

FIG. 8 illustrates a front elevation of a further electronic device 101 which, in this example, is a mobile computing device. The front face 110 of the further electronic device 101 includes an electronic display 111. FIG. 9A illustrates a front elevation showing the further electronic device 101 being retained by the apparatus 10. FIG. 9B illustrates a rear elevation showing the further electronic device 101 being retained by the apparatus 10. It can be seen from FIG. 9A that the electronic display 111 of the further electronic device 101 is left exposed when the electronic device 101 is retained by the housing 20.

Figure 10A:
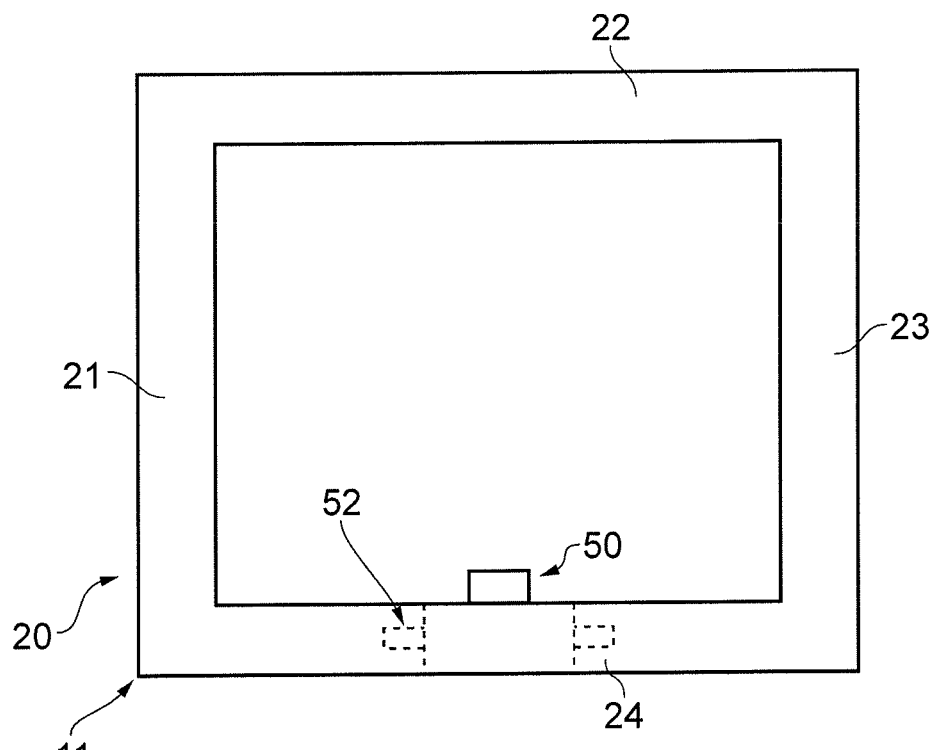
FIG. 10A illustrates a second apparatus comprising a movable electrical connector in a first position.
Figure 10B:
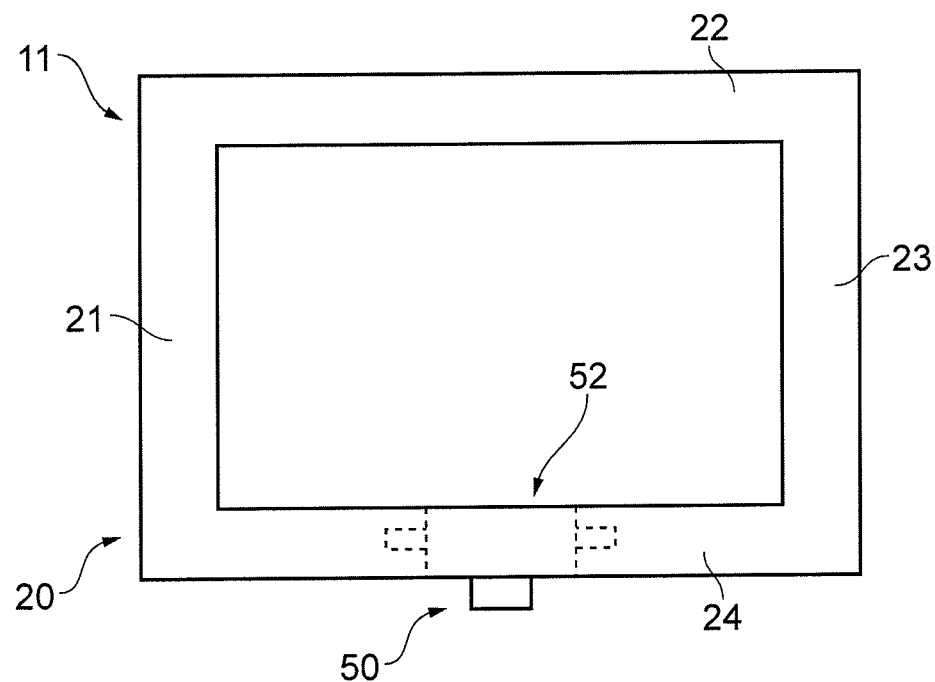
FIG. 10B illustrates the second apparatus with the movable electrical connector in a second position.

FIGS. 10A and 10B illustrate a further example 11 of the apparatus in which the electrical connector 50 is movable. In this particular example, the apparatus 11 comprises a mechanism 52 that enables the electrical connector 50 to be rotated. FIG. 10A illustrates the electrical connector 50 in a first position and FIG. 10B illustrates the electrical connector 50 in a second position. The electrical connector 50 has moved through substantially 180 degrees when moving from the first position to the second position. The electrical connector 50 extends in the opposite direction in the second position as compared to when it was in the first position. In some implementations, the mechanism 52 may comprise a detent configured to hold the electrical connector 50 in the first and/or second position.

When the electrical connector 50 is in the first position, it is positioned to provide energy received by the coil 40 to an electronic device being retained within the through-hole 30. When the electrical connector 50 is in the second position, it is positioned to provide energy received by the coil 40 to an electronic device located (wholly) outside the through-hole 30 (and outside the walls 21-24).

Figure 11:
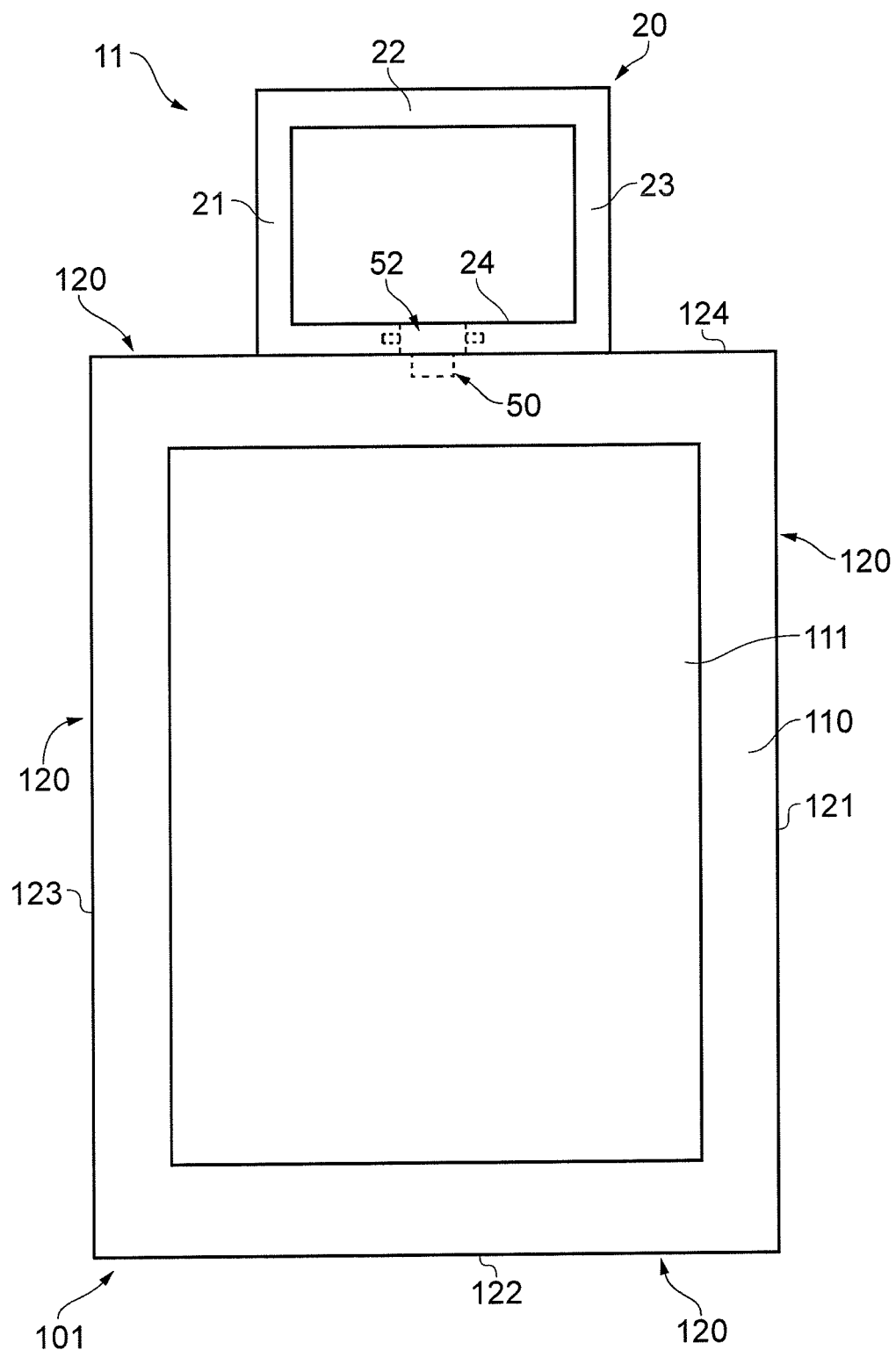
FIG. 11 illustrates the second apparatus connected to an electronic device when the movable electrical connector is in the second position.

FIG. 11 illustrates an example in which the apparatus 11 of FIGS. 10A and 10B is dimensioned to house a smaller electronic device than the mobile computing device 101 illustrated in FIG. 8. The apparatus 11 is shown with the electrical connector 50 in the second position. The apparatus 11 may be placed on or near a wireless charging station to order for the apparatus to provide energy to the mobile computing device 101 (and, for example, charge its battery).

Figure 12:
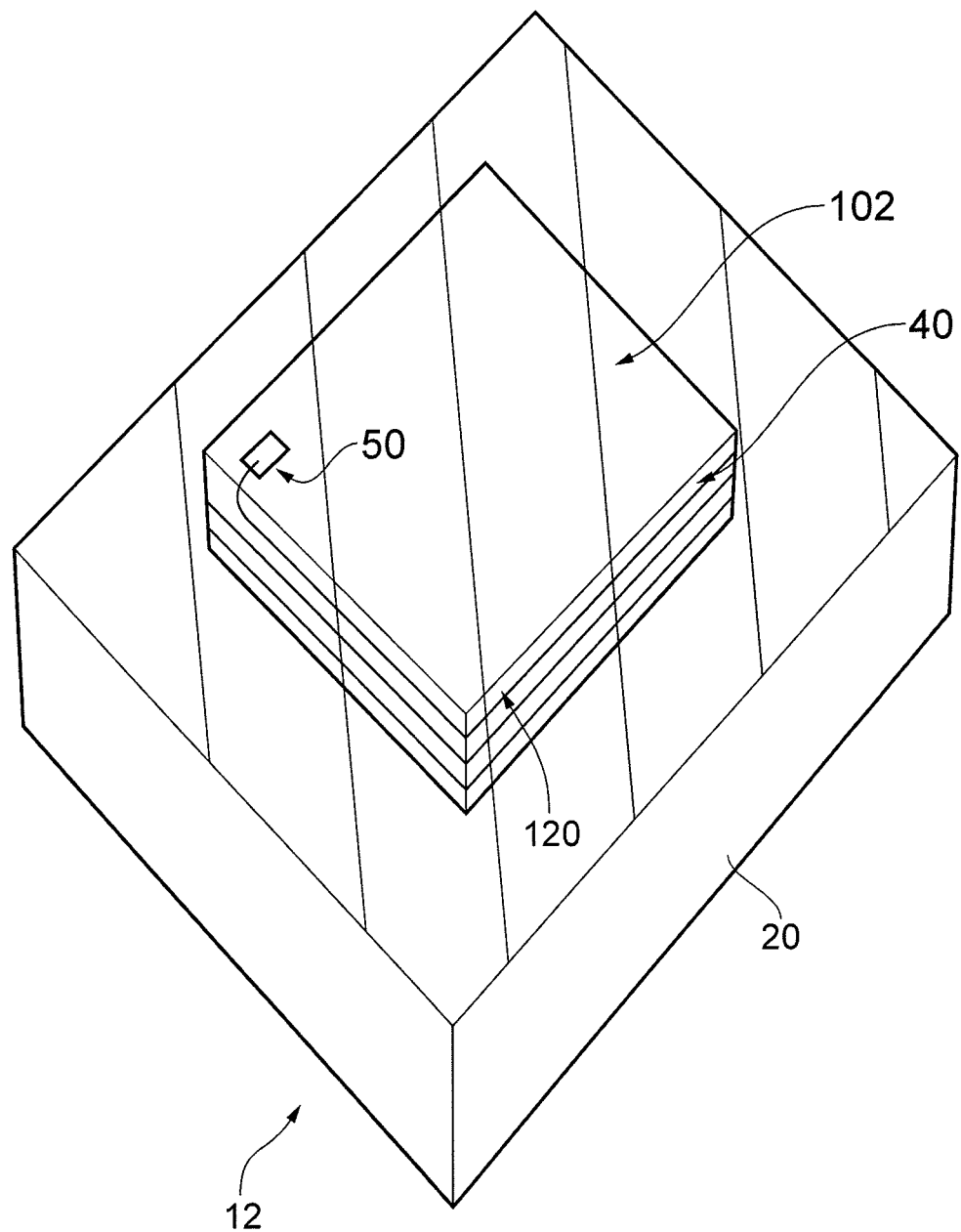
FIG. 12 illustrates a third apparatus.

FIG. 12 illustrates another example 12 of an apparatus. The apparatus 12 may, for example, be in the shape of a tile. In this example, the apparatus 12 comprises an electronic device 102, a housing 20 for housing the electronic device 102, a coil 40 for receiving energy wirelessly and an electrical connector 50 configured to provide energy received by the coil to the electronic device 102.

The electronic device 102 is wholly encompassed by the housing 20 in this example. Unless the apparatus 12 made from a material that is at least partially transparent, the electronic device 102 is not visible. The electronic device 102 is visible through the housing 20 in FIG. 12 for the purpose of explaining this example.

The electronic device 102 may, for instance, be a battery. The coil 40 is coiled around the periphery 20 of the electronic device 102. The coil 102 is also wholly encompassed by the housing 20.

Figure 13:
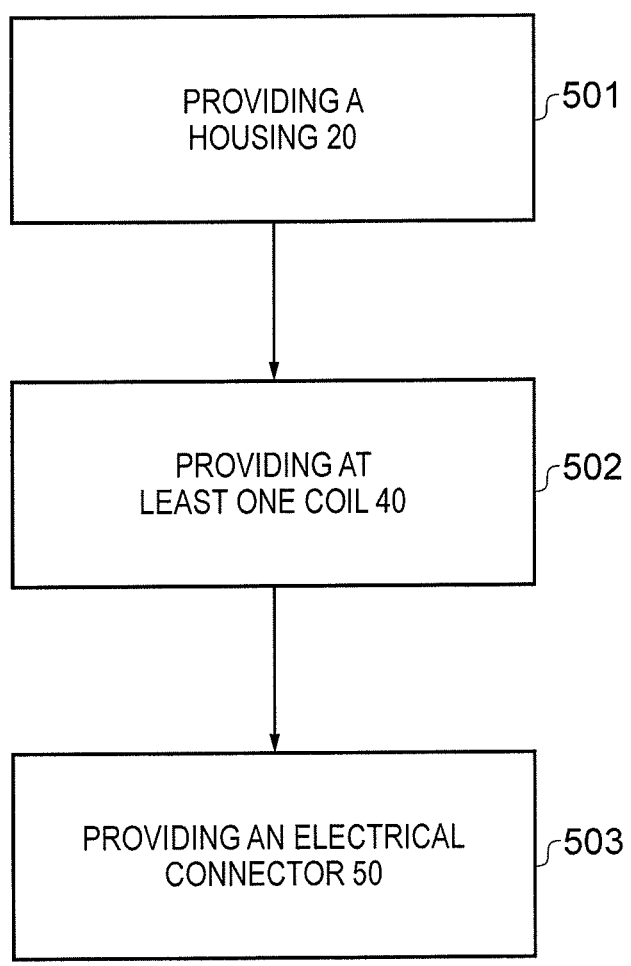
FIG. 13 illustrates a flow chart of a method.

FIG. 13 illustrates a flow chart of a method of manufacture of an apparatus 10/11/12 as described above. In block 501 of FIG. 13, a housing 20 as described above is provided. In block 502 of FIG. 13, at least one coil 40 as described above is provided. In block 503 of FIG. 13, an electrical connector 50 as described above is provided.

The illustration of a particular order to the blocks in FIG. 13 does not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed. For example, the housing 20 need not have the shape illustrated in any of the appended figures. The housing 20 could, for example, be circular in shape, with a single circumferential wall and a central through-hole 30 for use in retaining an electronic device.

The movable electrical connector 50 may not be rotatable and may instead be slidable or tiltable. In some implementations, the movable electrical connector 50 may be configured to move into more than two different positions.

In some examples, the apparatus 10/11 may include multiple electrical connectors, where a first electrical connector is positioned to connect to an electrical connector of an electronic device retained in the through-hole 30, and a second electrical connector is positioned to connect to an electrical connector of an electronic device positioned (wholly) outside the through-hole 30.

Although the walls 21-24 are described above as having a c-shaped cross-section, in some implementations this might not be the case. For example, the walls 21-24 could be L-shaped or substantially flat.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus, comprising: a housing having one or more walls, defining a through-hole, configured to retain an electronic device in the through-hole, wherein the housing is configured to retain the electronic device in the through-hole while leaving at least a first face and a second face of the electronic device substantially exposed; at least one coil configured to receive energy wirelessly, the at least one coil extending along at least one wall of the housing and about a peripheral surface of the electronic device that extends between the first and second faces of the electronic device; and an electrical connector configured to provide energy received by the at least one coil to an electronic device retained in the through-hole.

2. The apparatus as claimed in claim 1, wherein the first face and the second face of the electronic device are separated by the depth of the electronic device.

3. The apparatus as claimed in claim 2, wherein the electronic device has a length, a width and a depth, the length is greater than the depth, and the width is greater than the depth.

4. The apparatus as claimed in claim 1, wherein the first face of the electronic device comprises an electronic display.

5. The apparatus as claimed in claim 1, wherein the at least one coil extends along one or more walls of the housing.

6. The apparatus as claimed in claim 1, wherein the at least one coil is arranged to coil around the through-hole.

7. The apparatus as claimed in claim 1, wherein the housing is configured to retain an electronic device in the through-hole by gripping a periphery of the electronic device.

8. The apparatus as claimed in claim 1, wherein the at least one coil is configured to receive energy wirelessly from a further apparatus via inductive coupling.

9. The apparatus as claimed in claim 1, wherein the electrical connector is configured to provide energy received by the at least one coil to the electronic device in order to charge a battery of the electronic device.

10. The apparatus as claimed in claim 1, wherein the at least one coil is positioned within a recess in the housing.

11. The apparatus as claimed in claim 1, wherein the electrical connector is positioned to connect to a further electrical connector of the electronic device, when the electronic device is retained in the through-hole.

12. The apparatus as claimed in claim 1, wherein the electrical connector is movable relative to at least one or more walls of the housing.

13. The apparatus as claimed in claim 1, wherein the electrical connector is movable such that the electronic connector is connectable to an electronic device positioned outside the through-hole.

14. A method, comprising: providing a housing having one or more walls, defining a through-hole, configured to retain an electronic device in the through-hole, wherein the housing is configured to retain the electronic device in the through-hole while leaving at least a first face and a second face of the electronic device substantially exposed; providing at least one coil configured to receive energy wirelessly, the at least one coil extending along at least one wall of the housing and about a peripheral surface of the electronic device that extends between the first and second faces of the electronic device; and providing an electrical connector configured to provide energy received by the at least one coil to an electronic device retained in the through-hole.

15. The method as claimed in claim 14, wherein the at least one coil is arranged to coil around the through-hole.

16. An apparatus, comprising: a housing having one or more walls, defining a through-hole, for housing an electronic device, wherein the housing is configured to retain the electronic device in the through-hole while leaving at least a first face and a second face of the electronic device substantially exposed; at least one coil, for receiving energy wirelessly, coiled around an electronic device housed by the housing, the at least one coil extending along at least one wall of the housing and about a peripheral surface of the electronic device that extends between the first and second faces of the electronic device; and an electrical connector configured to provide energy received by the at least one coil to the electronic device.

* * * * *